Figure 1:
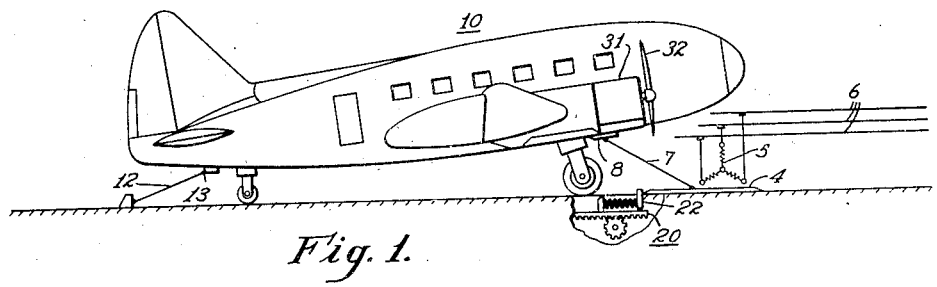

July 30, 1946.  M. F. JONES ET AL  2,404,963

TENSIONING DEVICE

Filed May 26, 1944

WITNESSES:
Edward Michaels

INVENTORS
Maurice F. Jones &
Harold F. Hanson.
BY O. B. Buchanan
ATTORNEY

Patented July 30, 1946

2,404,963

UNITED STATES PATENT OFFICE 2,404,963

TENSIONING DEVICE

Maurice F. Jones, Pittsburgh, and Harold F. Hanson, Wilkinsburg, Pa., assignors to Westinghouse Electric Corporation, East Pittsburgh, Pa., a corporation of Pennsylvania Application May 26, 1944, Serial No. 537,512

4 Claims. (Cl. 244—63)

Our invention relates to aircraft-launching apparatus, and it has more particular relation to a means and method of maintaining the towing-cable taut during the preliminary preparations for take-off prior to the aircraft-launching accelerating-run. More specifically, our invention relates to an adjustable chock, or other equivalent cable-tensioning means, for use in connection with aircraft-launching apparatus of the type utilizing a self-propelled towing-car.

Heretofore, difficulty has been encountered in connection with towing-cables which become slack during the initial preparations before take-off. When the aircraft-motors, or other propulsion-means, are momentarily energized, for test purposes, or even for initiating the aircraft-launching accelerating-run, the aircraft is likely to "squat," or slightly compress its tires and shock-absorbers, as the aircraft strains against its hold-back cable, or other hold-back means, thereby inching its front end forward and tending to produce slack in the towing-cable which extends from a front portion of the aircraft to the towing-car. When the strong energization of the traction-motors of the aircraft is discontinued or reduced, the front end of the aircraft rises up again, and pulls back on the towing-cable. This may happen several times, in varying degrees of severity, during preparations for take-off.

When the towing-cable becomes slack, two disadvantages result. First, the towing-cable may become unhooked from the aircraft, because the connection must be made so that, when the aircraft leaves the ground, at the actual moment of take-off, it shall be capable of disengaging itself from the towing-cable when the aircraft soars above and ahead of its towing-car. Even though the slackened towing-cable does not become disengaged from the aircraft, if it is still slack when the towing-car is strongly energized for its aircraft-launching accelerating-run, the towing-cable will be drawn up with a jerk which is extremely objectionable, in any event, and which is very likely to pull the towing-hook off of the aircraft, besides doing other damage to the aircraft.

When an aircraft-launching means is utilized, such as a self-propelled towing-car, the whole purpose of the launching-means is to apply a very large accelerating-force to the aircraft, for causing the aircraft to achieve its launching speed quickly. It is usually desirable, therefore, to avoid even momentarily holding back the aircraft after the application of the full launching force. It has become customary, in some quarters, therefore, to insert a fracture-ring in the connection between the hold-back cable and the rear end of the aircraft, so that, when the strong accelerating force is applied, for the commencement of the take-off run, this frangible link will promptly break and separate the holding-back cable from the aircraft.

It is an object of our invention to provide an adjustable chock which is utilized to be adjusted into position behind the rear end of the towing-car, so as to push the towing-car forward with a sufficient force to move the towing-car and take up the slack in the cables, and to hold the cables taut, with a yieldable force which is capable of permitting a forward or backward give, while maintaining enough tension on the cables to prevent slackness without danger of breakage of the fracture-ring in the hold-back cable-attachment.

More generally stated, an object of our invention is to provide a method and means whereby a relatively small amount of cable-tightening force or power may be applied either manually or mechanically to the towing-car during the preliminary preparations for take-off before the application of the relatively large amount of accelerating-run power to the self-propelling motive-means of the towing-car.

Figure 2:
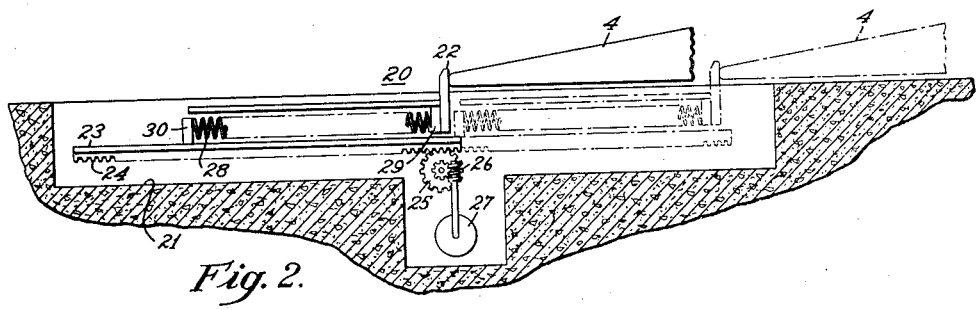
Figure 3:
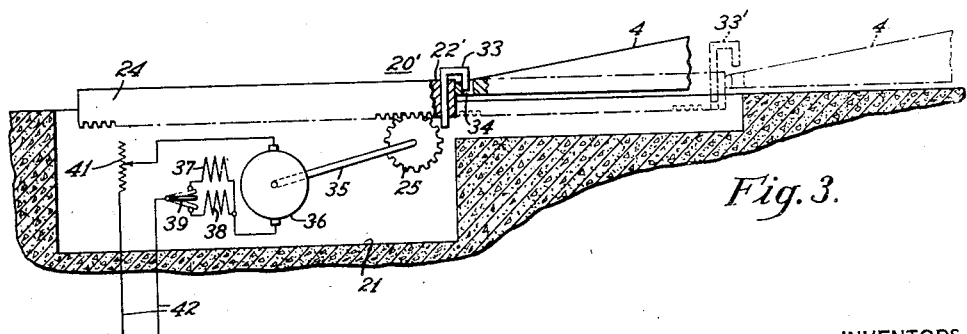

With the foregoing and other objects in view, our invention consists in the methods, systems, combinations, apparatus and parts hereinafter described and claimed, and illustrated in the accompanying drawing, wherein:

Figure 1 is a diagrammatic side-elevational view, with some of the parts not to scale, for clarity of illustration, showing the general take-off assembly, and Figs. 2 and 3 are diagrammatic longitudinal elevational views, with parts similarly not to scale, illustrating two different forms of embodiment of our adjustable chock.

As shown in Fig. 1, our invention is utilized as an adjunct for an electric catapult which comprises a towing-car 4 which is self-propelled by means of a linear motor, the primary windings of which are indicated at 5, being energized from a polyphase third-rail bus 6, or other suitable source of power. The towing-car may be similar to that which is shown and described in an application of Frank B. Powers, Serial No. 473,483, filed January 28, 1943, or in an application of Maurice F. Jones, Serial No. 506,197, filed October 14, 1943, both assigned to the Westinghouse Electric & Manufacturing Company.

The towing-car 4 is provided with a towing-cable 7 which is adapted to be attached to a towing-hook 8 on a forward under portion of a plane 10 to be launched. A suitable disengageable hold-back means is preferably utilized to restrain the airplane 10, or other aircraft to be launched, prior to the actual commencement of the aircraft-launching accelerating-run. In Fig. 1, this hold-back means is shown in the form of a hold-back cable 12 which is connected, by means of a fracture-ring 13, to a rear portion of the aircraft 10.

Our present invention relates to adjusting means for inching the towing-car 4 forwardly after the cables 7 and 12 have been applied, so as to take up slack in said cables, and thereafter hold them taut until the very instant when the power for the accelerating-run is applied to the towing-car. This adjusting means is indicated generally by the numeral 20, in Figs. 1 and 2, or it may take a slightly different form, as indicated at 20' in Fig. 3. This adjustment-means may take the form of a chock-device, which has a stationarily supported frame-member which may be a suitable excavation 21, and which is provided with an up-standing pushing-member 22, which is adapted to push against the rear end of the towing-car 4, or against any other rearwardly facing portion of the towing-car, so that, when the towing-car starts its accelerating-run, under its heavy accelerating-power, it will simply move away from the pushing-member 22.

In the form of our invention which is shown in Fig. 2, the pushing-member 22 is movably carried by a movable support, or carriage, or slide 23, which carries a longitudinally extending rack 24 which is engaged by a pinion 25, to which a suitable turning-force can be applied, so as to move the rack 24 forwardly and backwardly, and lock it in any position to which it is moved. We are not confined to any particular moving and locking-means for the rack and pinion 24—25. By way of illustration, we have indicated an irreversible worm-gear drive 26 which is driven by a reversible electric motor 27, or other motive-means, either power-driven or manual.

A resilient, or other yieldable, force-applying connection is provided between the pushing-member 22 and the movable support 23 therefor. In Fig. 2, this connection is shown in the form of one or more longitudinally extending compression-springs 28 which extend between an abutment-block 29 on the rear surface of the pushing-member 22, and a rear abutment-block 30 which is carried by the movable member or carriage 23.

In the operation of our invention as shown in Figs. 1 and 2, the movable chock-carriage or slide 23 is first moved to its rearmost position, as indicated in Fig. 2, and then the towing-car 4 is pushed, or propelled, or caused to move, rearwardly until its rear end abuts against the pushing-member 22, or chock-proper. The aircraft 10 is then (or previously) rolled into place, and the hold-back cable 12 and the towing-cable 7 are then applied, and the slack in the cables is taken up by slowly moving the rack 24 forward, pushing the towing-car 4 forward far enough to pull the cables 7 and 12 taut. The forward advancing movement of the rack 24 is then continued until the compression-spring 28 is set up a predetermined amount, so that it will be capable of maintaining a yieldable pressure against the pushing-member or chock 22, this pressure reacting against the movable carriage or slide 23, and thence, through the rack-locking device 26, to the stationary foundation, since the worm-gear connection 26 acts as a locking means when the motor 27 is stationary.

The spring 28 thus serves as a yieldable means which maintains a pressure on the pushing-member 22, with a follow-up action, and also a yieldable action, thus permitting the pressing-member 20 to quickly inch forwardly, as occasion may demand, in order to keep the cables 7 and 12 taut, and whereby the pushing-member may itself quickly be pushed back, as when the aircraft 10 rises up on its wheels, or spring-mounting, and pulls back on the towing-car. These yielding adjustments will take place quickly so as to maintain the cables taut, at all times. The amount of pushing-force is determined by the amount of setting up of the springs 28, which are sufficiently long so that the force does not vary too greatly during the self-adjustments of the tautness-maintaining apparatus.

This forwardly-pressing force, which is applied to the pressing-member or chock-member 22, is just reasonably sufficient to move the towing-car and make and keep its towing-cable taut during preliminary preparations for take-off. This tension-maintaining force is considerably smaller than the accelerating force which is developed by the towing-car motor 5, so that the force necessary to break the fracture-ring 13 may be somewhere in between these two extremes. In this way, there is no danger of a breakage of the fracture-ring 13 until the aircraft-launching accelerating-force is applied by reason of the full energization of the towing-car motor 5.

A common-practice, in launching operations, is for the aircraft-motor 31 to be accelerated, so as to drive the aircraft-propeller 32 at its full take-off speed, just a moment prior to the application of the accelerating-take-off energy to the towing-car 4. This causes the aircraft 10 to "squat," as previously explained, and the towing-car 4 is immediately inched forward by our chock-device, sufficiently to maintain the cables 7 and 12 taut, in the moment prior to the full energization of the towing-car 4, for the commencement of the take-off accelerating-run. As soon as this full accelerating force is applied, the fracture-ring 13 breaks, and disengages the hold-back cable from the rear end of the aircraft 10, thus permitting the aircraft to be accelerated to its full take-off speed, under the joint impetus of the aircraft-propellers 32 and the towing-car 4.

We are not limited to any particular means for applying the yieldable cable-tightening force to the pushing-member or chock 22, or even to the use of a chock or pushing-member, as distinguished from any other means for gently inching the towing-car 4 forward during the preliminary cable-tightening procedure preparatory to take-off. In the broader aspects of our invention, we contemplate that any equivalent means, or pushing or draft-means, for utilizing either mechanical motive-means, manual power, or animal-power, may be utilized for the purpose stated.

In Fig. 3, we have shown a different form of chock-device 20', in which the pushing-member 22' is provided with a detachable hook or grapple 33, which can be let down into engagement with a hole or ring 34 in the rear end of the towing-car 4. By this means, the pushing-member 22' can be utilized as a retracting member, for pulling the towing-car back into the proper position for the attachment of the cables 7 and 12 of the aircraft, as shown in Fig. 1, after which the hook or grapple 33 may be elevated, or otherwise disengaged, as shown in dotted lines at 33' in Fig. 3, so that the pushing-member 22' may then be used solely as a pushing-member which is yieldably pushed forward, with a force suitable for tightening the cables 7 and 12, and keeping them in proper tension, as previously described.

In Fig. 3, we have also shown, by way of illustration, an alternative form of embodiment of the means for developing the yieldable pushing-force applied to the pushing-member 22'. In this case, the rack 24 is engaged by a pinion 25 which is driven, through a reversible drive-connection 35, from a reversible electric motor 36, having forward and reversing field-windings 37 and 38, either one of which may be energized by means of a reversing-switch 39. A serially connected torque-controlling rheostat 41 is also shown in the main connections of the motor 36. The motor 36 derives its power from any suitable source, such as a direct-current line 42.

In the operation of the device shown in Fig. 3, the motor 36 is capable of developing substantially its full torque, whether it is rotating, or whether it is standing stationary, or whether it is inching forwardly, or being pushed backwardly by reason of the backward-thrust exerted against the pushing-member 22' by the rear end of the towing-car 4, which is being pulled backwardly by the tension of the towing-cable 7, when the aircraft 19 rises from a "squat" position and pulls back on said towing-cable. The reversible drive-connection 35 of Fig. 3, unlike the non-reversing worm-gear connection 26 of Fig. 2, permits the backward thrust on the rack 24 to move the rack backwardly, and turn back the motor 36 against its forwardly-exerting motor-torque. Otherwise, the operation of the apparatus shown in Fig. 3 is similar to that which was described in connection with Fig. 2.

While we have illustrated our invention in only two forms of embodiment, we desire it to be understood that we are not limited to the particular illustrated forms of embodiment, as many changes in details, substitutions, additions, and omissions may be made by those skilled in the art, without departing from the essential principles of our invention. We desire, therefore, that the appended claims shall be given the broadest interpretation consistent with their language.

We claim as our invention:

1. An aircraft-launching apparatus comprising a self-propelled towing-car having a towing-cable for pulling the aircraft from the towing-car, and a chock-device, said chock-device comprising a stationarily supported frame-member disposed in a predetermined position with respect to the towing-car when the towing-car is standing in its starting-position ready for an aircraft-launching accelerating-run, a pushing-member movably carried by said frame-member in position to be moved up against a portion of the towing-car, and means for applying a limited, follow-up pushing-force from said frame-member to said pushing-member, with a limited follow-up movement, and with a force just reasonably sufficient to push the towing-car along and make and keep its towing-cable taut during preliminary preparations for take-off before the application of self-propelling power to the towing-car.

2. Aircraft-launching apparatus comprising a self-propelled towing-car having a towing-cable for pulling the aircraft from the towing-car, and a pusher-device, said pusher-device comprising a retractable pushing-member, and reversible motive means for moving said pushing-member forwardly and backwardly, said motive means, in its forward-urging action, being capable of maintaining a steady, yieldable, pushing-force which is maintained while the pushing-member either remains stationary, advances forwardly, or gives way backwardly, with a force just reasonably sufficient to push the towing-car along and make and keep its towing-cable taut during preliminary preparations for take-off before the application of self-propelling power to the towing-car.

3. Aircraft-launching apparatus comprising a self-propelled towing-car having a towing-cable for pulling the aircraft from the towing-car, and a pusher-device, said pusher-device comprising a retractable pushing-member, a reversible motor, and a reversible drive-connection between said motor and said pushing-member, for moving said pushing-member forwardly and backwardly, said motor being capable of maintaining a steady, yieldable, driving-force whether the motor is advancing, standing still, or being driven backwardly by the reversible drive connection, with a force just reasonably sufficient to push the towing-car along and make and keep its towing-cable taut during preliminary preparations for take-off before the application of self-propelling power to the towing-car.

4. Aircraft-launching apparatus comprising a self-propelled towing-car having a towing-cable for pulling the aircraft from the towing-car, and an adjustable chock-device, said chock-device comprising a movable support, a pushing-member movably carried by said movable support, slow-movement adjustment-means for slowly moving said movable support into an adjusted position with its pushing-member up against a rearwardly facing portion of the towing-car, and more quickly movable force-applying means, operable more quickly than said slow-movement adjustment-means, for applying a limited, follow-up pushing-force from said movable support to said pushing-member, with a limited follow-up movement, and with a force just reasonably sufficient to push the towing-car along and make and keep its towing-cable taut during preliminary preparations for take-off before the application of self-propelling power to the towing-car.

MAURICE F. JONES.
HAROLD F. HANSON.